(12) United States Patent
Edwards

(10) Patent No.: US 9,063,642 B2
(45) Date of Patent: Jun. 23, 2015

(54) TEXT ENTRY DEVICE AND METHOD

(75) Inventor: Douglas Joseph Edwards, Ajax (CA)

(73) Assignee: Electronic Systems Software Solutions Inc., Pickering, ON (CA)

( * ) Notice: Subject to any disclaimer, the term of this patent is extended or adjusted under 35 U.S.C. 154(b) by 0 days.

(21) Appl. No.: 13/520,235

(22) PCT Filed: Oct. 7, 2011

(86) PCT No.: PCT/CA2011/001128
§ 371 (c)(1),
(2), (4) Date: Jul. 2, 2012

(87) PCT Pub. No.: WO2012/045161
PCT Pub. Date: Apr. 12, 2012

(65) Prior Publication Data
US 2013/0191773 A1   Jul. 25, 2013

(30) Foreign Application Priority Data

Oct. 7, 2010   (CA) ..................................... 2716677

(51) Int. Cl.
| | | |
|---|---|---|
| *G06F 3/048* | (2013.01) | |
| *G06F 3/0484* | (2013.01) | |
| *G06F 17/27* | (2006.01) | |
| *G06F 3/023* | (2006.01) | |
| *G06F 3/0489* | (2013.01) | |

(52) U.S. Cl.
CPC .......... *G06F 3/04842* (2013.01); *G06F 17/276* (2013.01); *G06F 3/0236* (2013.01); *G06F 3/04892* (2013.01)

(58) Field of Classification Search
CPC ............................ G06F 3/0233–3/0237; G06F 3/4886–3/04897; G06F 3/04812–3/04883; G06F 3/01; G06F 3/048
See application file for complete search history.

(56) References Cited

U.S. PATENT DOCUMENTS

| | | |
|---|---|---|
| 4,385,291 A | 5/1983 | Piguet |
| 4,680,728 A | 7/1987 | Davis, II et al. |
| 4,911,565 A | 3/1990 | Ryan |
| 4,951,033 A | 8/1990 | Sakaguchi |
| 5,067,103 A | 11/1991 | Lapeyre |
| 5,197,811 A | 3/1993 | Levinrad |
| 5,559,512 A | 9/1996 | Jasinski et al. |
| 5,627,980 A | 5/1997 | Schilit et al. |

(Continued)

FOREIGN PATENT DOCUMENTS

| | | |
|---|---|---|
| EP | 0313207 | 6/1989 |
| EP | 0889388 | 3/2000 |

(Continued)

*Primary Examiner* — Claudia Dragoescu
(74) *Attorney, Agent, or Firm* — Kagan Binder, PLLC

(57) ABSTRACT

The present invention is a device for processing text strings by displaying at least two bands of characters of an alphabet, each band having one character designated as the focus character, with the focus character of a first band being highlighted initially, and having a band switching means for switching the highlighted character to the focus character of another band, a character choosing means for switching the highlighted character in a band to a different character in the band, and a character selecting means for selecting the currently highlighted character. The character choosing means and band switching means are typically arrow buttons on a control device and the character selecting means is typically an "enter" button. The invention also includes the corresponding method of entering text strings into a text processing device.

15 Claims, 3 Drawing Sheets

(56) References Cited

U.S. PATENT DOCUMENTS

| | | | |
|---|---|---|---|
| 6,052,070 A | * | 4/2000 | Kivela et al. ............... 341/22 |
| 6,392,640 B1 | | 5/2002 | Will |
| 6,593,913 B1 | | 7/2003 | Krohn et al. |
| 6,980,200 B2 | | 12/2005 | Goren |
| 7,079,115 B2 | | 7/2006 | Arnold |
| 7,190,351 B1 | | 3/2007 | Goren |
| 7,439,957 B2 | | 10/2008 | Chu et al. |
| 7,530,031 B2 | | 5/2009 | Iwamura et al. |
| 7,548,231 B1 | | 6/2009 | Goren |
| 2003/0014753 A1 | * | 1/2003 | Beach et al. ............... 725/53 |
| 2004/0066405 A1 | * | 4/2004 | Wessler et al. ............ 345/764 |
| 2004/0080487 A1 | * | 4/2004 | Griffin et al. ............. 345/156 |

FOREIGN PATENT DOCUMENTS

| | | |
|---|---|---|
| WO | WO/02/42857 | 5/2002 |
| WO | WO/02/091160 | 11/2002 |
| WO | WO/2004/100510 | 11/2004 |

\* cited by examiner

TEXT ENTRY DEVICE AND METHOD

FIELD OF THE INVENTION

The present invention relates generally to devices and methods for entering text, and in particular, to devices and methods for entering text by selection of displayed characters.

BACKGROUND OF THE INVENTION

The types and numbers of small devices and devices with limited input capability has increased rapidly in recent years. Devices such as cell phones, other mobile devices, set-top boxes and other general computing devices that may have limited input functions or options are common. Such devices often require a user to enter text, or strings of characters, for purposes of communication and control. The size and limited number of input keys in such devices often leads to slow text entry, which can decrease the effectiveness of the device and make it less desirable to use.

While a full keyboard may be an effective means of entering text, it is often not practical to have a keyboard for size or other reasons. Many alternate approaches to entering text have been developed, such as triple-tap and T-9. These are difficult to use and slow, particularly in low light conditions.

On-screen keyboards are also often used, typically with arrow keys or buttons being used to scroll though a displayed alphabet to move a cursor between characters in the alphabet, and a selection, or "enter", key or button being used to choose or select individual characters when they are under the cursor, or otherwise highlighted. For example, each time the selection key is pressed, the character currently highlighted may be copied to a separate location on the screen that contains the text string being entered. Each such character may be added to the end of the text string when it is selected, and when the user is satisfied that the string is correct, then the user may select a displayed string entry symbol in order to submit the string for processing by the device.

Typically the alphabet is displayed as a linear array that may scroll as an arrow button is pressed. If the entire alphabet cannot fit on the screen then characters may scroll onto the display as the cursor is moved. In other systems, the characters may be displayed to look like a physical keyboard, for example with a QWERTY layout. Left and right buttons may then be used to move within a row, possibly moving to the next or previous row when the cursor moves past the right or left ends of a row, respectively.

Mode "keys", such as a shift button, may also be used to modify the displayed keyboard or linear array to change the case or to display special characters.

In general, such methods of composing input text strings are time consuming, and may be very annoying for users when they are required to type in lengthy strings.

SUMMARY OF THE INVENTION

The invention is directed to a method for a user to specify a text string, the text string comprising a sequence of characters selected from an alphabet of characters, the method being performed by a processor running software, the method comprising the steps of:
(a) generating a display for presentation to a user, the display depicting at least two bands of characters, including a first band;
(b) designating one character in each band to be a focus character, with the focus character of the first band being highlighted initially in the display;
(c) until a text string submission request from the user is received,
  (i) if a character switch request is received from the user, removing the highlighting from the highlighted character in the display, and highlighting another character in the same band as requested by the user,
  (ii) if a band switch request is received from the user, removing the highlighting from the highlighted character in the display, and highlighting the focus character in another band as requested by the user,
  (iii) if a character selecting request is received from the user, selecting the highlighted character, and appending the selected character to the text string; and
(d) when a text string submission request is received, submitting the text string to a string processor.

The steps of the method may be repeated with step (d) further comprising clearing the text string.

The bands may be ordered from the first band to a last band, the band switch request may specify whether to switch to the next band or the previous band in the order, and the other band in step (c)(ii) may be the next band in the order if the next band was specified and there is a next band, or the previous band in the order if the previous band was specified and there is a previous band.

The bands may be ordered from the first band to a last band, and the other band in step (c)(ii) may be the next band in the order, where the first band is the next band after the last band.

The characters in each band may be ordered from a first character to a last character, the character switch request may specify whether to switch to the next character or the previous character in the order, and the other character in step (c)(i) may be the next character in the order if the next character was specified and there is a next character, or the previous character in the order if the previous character was specified and there is a previous character.

The invention is also directed to a system for generating text strings comprising:
(a) a processor running software adapted to generate a display for presenting at least two bands of characters to a user, each band having one character designated as a focus character, with the focus character of a first band being highlighted initially in the display;
(b) a band switching means for switching the highlighting to the focus character of one of the bands that does not contain the highlighted character;
(c) a character choosing means for switching the highlighting from the highlighted character in a band to one of the other characters in the same band;
(d) a character selecting means for selecting the highlighted character and appending the selected character to the text string; and
(e) a string submission means for submitting the text string composed of the sequence of selected characters to a string processor.

For such a method or system, each character in the alphabet may be contained in one and only one of the bands, the characters in each band may be displayed in alphabetical order, and the characters in the alphabet may comprise the letters A to Z, the numbers 0-9, and a space.

The bands may be displayed horizontally, the band switching means may be up and down buttons, and the character choosing means may be left and right buttons.

The bands may be displayed vertically, the band switching means may be left and right buttons, and the character choosing means may be up and down buttons.

The character selecting means may be a button.

DETAILED DESCRIPTION

The current invention is based on alphabetic, numeric and special/symbol character input for application user interfaces on varying devices such as, but not limited to, computers, set top boxes, mobile devices, and other general computing devices that may have limited input functions or options, such as keyboards, touch screens, remote controls and other human-computer interface devices. The invention provides a faster, more intuitive alternative to the traditional on-screen input methods such as an on-screen keyboard, triple-tap or T-9. The invention addresses inherent issues that arise in text entry via limited function remote devices—ease of use and speed of input. Use of triple tap or T-9 is difficult and slow to use in low light conditions, especially where the device design does not incorporate back-lighting. On-screen keyboards become difficult and slow to use while entering longer sets of characters, such as when completing a form with the user's name, email address and phone number.

Figure 5:
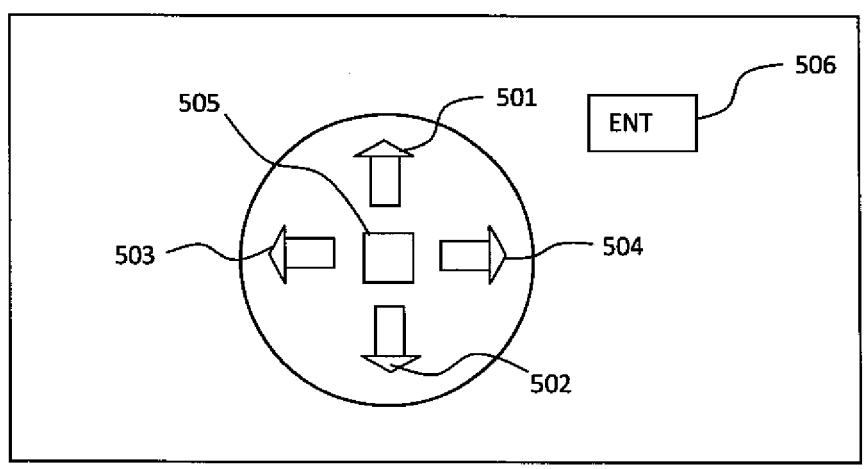
FIG. 5 is a depiction of a controller for controlling the entry of text.

The invention provides a computer system and a method for a user to specify a text string. The method is compatible with any system having control keys or buttons that can effect up, down, left and right movements of a cursor or highlighting and having a means to select a currently highlighted character, which may be referred to as a "select" key or button. For example, FIG. 5 shows a control device, or a portion thereof, with four arrow buttons 501-504 comprising an up button 501 to move a cursor or highlighting up, a down button 502 to move a cursor or highlighting down, a left button 503 to move a cursor or highlighting left and a right button 504 to move a cursor or highlighting right, and a select button 505 to select the currently highlighted character. The control device may be a portion of a typical television or set-top box remote control that includes a select button surrounded by four arrow buttons. The control device may also have an "enter" button 506, which may be used as a text string submission means.

The method is generally implemented using a computer processor running software that generates a display for presentation to a user. The processor may directly present the display to the user on a display device, or send it to another processor to be displayed and to obtain user input. The user may then provide input to the software in the form of requests to move the highlighting between characters within a band, move the highlighting between bands, select the highlighted character and append it to a text string, and submit the text string to a string processor. The string processor may be the same processor, or it may be a separate device. The string processor may, for example, perform processing that depends on the contents of the text string, or it may simply store the string for later use. In the latter case, "submitting the text string to a string processor" may simply entail the processor that generates the display storing the text string in a computer readable memory.

In some embodiments, the software may also include directions, or a specification of the required input, as part of the display. For example, the display may include the words "Enter your password" above the bands in the display and show a blank string that the user is to add characters to in order to form a password.

The invention is also compatible with any system having a character choosing means that can function as a right arrow, a band switching means that can function as a down arrow, and having a character selecting means that can function as a select button. A single right arrow may provide the same functionality as a right and left arrow by rotating through the displayed characters or bands, jumping to the left-most character or upper-most band after leaving the right-most character or lower-most band. In general, one push of the right arrow will advance the highlighting to the next character to the right of the character that is currently highlighted. A single down arrow may be similarly employed to switch the highlighting from one band to the next band below that band, highlighting the focus character of that band, where the first (or top or upper-most) band is considered to be the next band after the last band.

The basis of the invention is the concept of the alphabetic spectrum. There are 26 characters in the English alphabet. Additional characters, such as the space character, are also generally required. The numbers 0-9 are often also required. When used by itself herein, the word "alphabet" refers to a particular set of characters, such as the English uppercase letters A-Z, the English lowercase letters a-z, the numbers 0-9 and space. An alphabet may comprise any such set of characters and may include various special characters, such as !, @, #, $, %, ^, &, *, (, ), [,], :, {,}, \, |, ~, ', as well as a comma and letters used in languages other than English, with or without accents that may be used in particular languages.

With fixed navigation, as in the prior art, through limited input devices, reaching desired alphabetic characters can require, a significant number of key presses in order to select a desired character. The invention splits the spectrum into usable segments, or bands, generally still providing the user with access to the entire alphabetic sequence. In some cases, the use of a reduced alphabet, being a subset of the full alphabet, may be appropriate, depending on the application.

Figure 1:
FIG. 1 is a depiction of the English alphabet showing the division of the alphabet into two bands.
Figure 2:
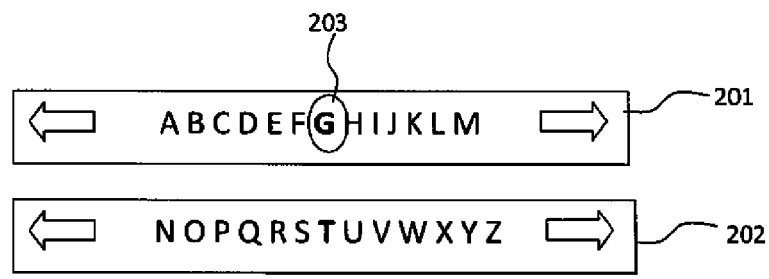
FIG. 2 is a depiction of an input screen employing an embodiment of the invention using two horizontal bands of characters.
Figure 6:
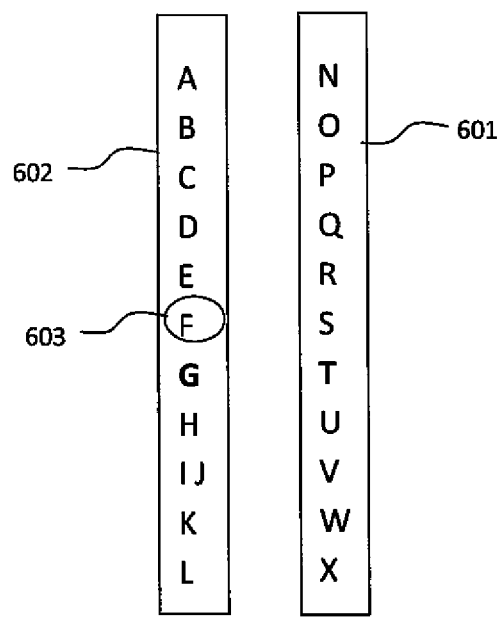
FIG. 6 is a depiction of an input screen employing an embodiment of the invention using two vertical bands of characters.

FIG. 1 shows the upper case English alphabet. The letters G 101 and T 102 are the focus letters in the middle of the upper and lower halves of the alphabet respectively, shown as two bands 201, 202 in FIG. 2. The letters within a band are generally displayed in alphabetical order with each letter being displayed exactly once. The alphabet may be split into a minimum of two bands 201, 202 which may be displayed as rows, as shown in FIG. 2, or as columns 601, 602, as shown in FIG. 6. It is not essential that they be displayed strictly vertically or horizontally; for example, the bands may be curved.

Figure 3:
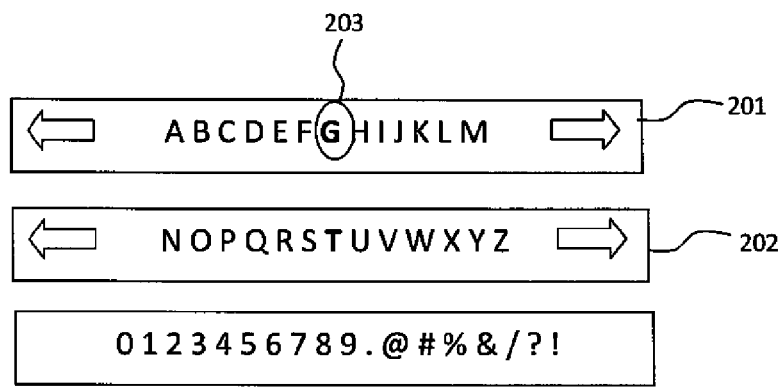
FIG. 3 is a depiction of an input screen employing an embodiment of the invention using three horizontal bands of characters.

In a preferred embodiment, the focus character is set to be the central character in each band, such as G in the first band 201, containing the first half of the upper case letters in the alphabet, and T in the second band 202, containing the second half of the upper case letters in the alphabet. In FIGS. 2-4 and 6, the letters G and T are in bold font as an indication that they are the focus characters of their respective bands, although it is not necessary to so differentiate the focus characters. At the start of text entry, for example with a two-band embodiment, the G in the middle of the first band 201 may be highlighted (such as by circling it as shown in FIGS. 2 and 3 as item 203 and in FIG. 6 as item 603) as the focus character. The user may then use the left button 503 and right button 504 as character choosing means to move the highlighting to other characters in the first band 201. Typically, one push of the right button 504 moves the highlighting to the next character in the same band to the right of the currently highlighted character, where the characters are ordered from left to right. Similarly, one push of the left button moves the highlighting to the previous character in the same band, being the character to the left of the currently highlighted character.

Other character choosing means are also possible, such as, in the case of horizontal bands, horizontal movement on a touch pad, left/right movement of a joystick, horizontal rotation of a trackball, using a voice command indicating which direction to move, or some other movement of the control device, such as left/right movement of the device. Such touch pads, joysticks, and trackballs may be located on a remote control.

When the desired character is highlighted the user may push the select button 505 as a character selecting means to select the highlighted character. Other character selecting means are also possible, such as tapping on a touch pad, pushing down on a joystick, pushing a trackball, using a voice command, or some other movement of the control device. Such touch pads, joysticks, and trackballs may be located on a remote control.

After a character is selected, it is typically then displayed in a separate area of the display as the last (right-most when using an English alphabet) character in a partial text string that is initially blank, or empty. The highlighting may then remain on the selected character. Alternatively the highlighting may be returned to the focus character of the current band, or, in the case of a two-band embodiment, the focus character of the other band that does not contain the currently highlighted character.

For example, to enter the letter K as the first letter in a text string, starting from the display as shown in FIG. 2, the user could push the right button 504 four times and then push the select button 505. If the user wishes to enter a character displayed on the second band 202, then the user may use a band switching means such as pressing the down arrow to jump to the focus character of the second band 202 and highlight the T character, which is the focus character of the second band 202. It is a key aspect of the invention that whenever the user changes bands (i.e. moves the highlighting between bands), the highlighting moves to the focus character of the newly selected band, which is normally the middle or center character. This may be advantageous, for example, if the user wishes to enter a G immediately after entering an A in a two-band embodiment. In that case the user can simply move to the second band by pushing the down arrow 503 and then move back to the first band, highlighting the G key, by pushing the up arrow 504.

The band switching means is any means of switching the highlighting from the band that contains the currently highlighted character to a band that does not contain the currently highlighted character. If a cursor is employed, the currently highlighted character may refer to the character co-located with the cursor. Highlighting may involve drawing a circle or polygon around the character, altering the brightness or font of the character, for example to make it bold, or to otherwise highlight it, such as by inverting the colors of the character and the immediately surrounding screen area. The band switching means typically consists of up and down buttons in the case of horizontal bands, and left and right buttons in the case of vertical bands, but other means may be employed. For example, a single button could be used to rotate though the bands. Examples of other means include a movement on a touch pad, movement of a joystick, rotation of or pressing a trackball, using a voice command, or some other movement of the control device. The bands are generally considered to be ordered from top to bottom in an embodiment where the bands are displayed horizontally, so that the first band is the top, or upper-most, band, and the last band is the bottom, or lower-most, band. Pressing a down arrow may cause the highlighting to move to the next band, i.e. the band below the band it was previously on. In some embodiments, the first band may be considered to be the next band after the last band, so that pushing the down arrow when a character in the last band is highlighted moves the highlighting to the focus character in the first band. Similarly, pushing the up arrow may move the highlighting to the focus character in the previous band, where the last band may be considered to be the previous band to the first band. In an embodiment where the last band is not considered to be the previous band to the first band, pushing the up arrow when a character in the first band is highlighted would do nothing.

Additional characters that are essential for the application (e.g. typically a space character) may be added to the end of the second band 202, for example. Alternatively, additional bands may be added based on the need for numeric and special characters and symbol input requirements. For example, FIG. 3 shows a three-band implementation where the third band 301 contains numbers and special characters. In the depicted embodiment, the character 9 is chosen as the focus character of the third band 301 so that it will be highlighted by default when the user moves down from the second band 202 by pushing the down arrow 502 when a character in the second band 202 is highlighted.

Figure 4:
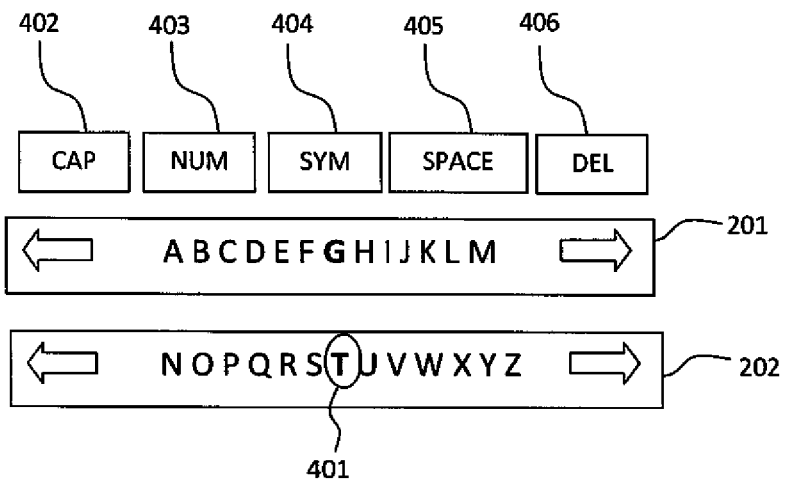
FIG. 4 is a depiction of an input screen employing an embodiment of the invention using two horizontal bands of characters with a row of toggle, or mode, buttons.

An alternative to adding additional bands is to present a number of toggle or mode buttons in the interface, such as those depicted in FIG. 4. These buttons can enable the user to toggle the contents of the two displayed bands, for example, to a lowercase view of the alphabet characters by selecting the CAPS button 402, display numbers by selecting the NUM button 403, or display special characters by selecting the SYM button 404. Cursor-based functions such as, but not limited to, delete 406, backspace, and space 405 may be similarly provided.

A string submission means may also be provided in order to submit the currently assembled text string to a string processor. This could be an "enter" button on the display, or a separate physical button 506 on a remote. When the text string is submitted by using the string submission means, the string that was displayed is typically cleared or deleted so that the user can begin creating a new text string. A "clear" button may also be provided to achieve the same result without submitting the text string to the processor. In some cases, the use of a string submission means may not be required, for example if the text string to be input is of a fixed length, such as when entering a four-digit PIN.

The processor may be a general purpose CPU programmed by software or may be a purpose-build hardware processor for implementing the specific functions that the device performs.

Figure 7:
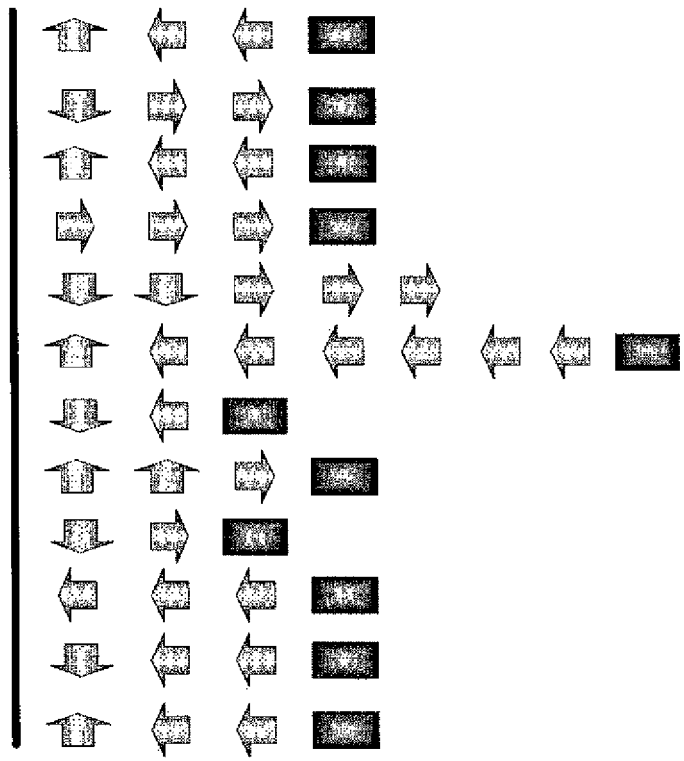
FIG. 7 shows a sequence of button presses used to enter a particular text string.

For horizontally oriented bands, the user can press left or right hardware buttons 503, 504 or software generated buttons to scroll across a band and then press the select button 505 when the desired character is highlighted. A key method that differentiates the invention from other input methods is the ability of the user to "jump" (i.e. move the highlighting) from one band to another. After selecting the desired character, the user can navigate to an adjacent band using a band switching means in order to select a character that might be at other end of the alphabetic spectrum, resulting in fewer key presses to reach the desired character than conventional screen entry methods. When the user jumps from one band to another, the previously highlighted band resets to its original state, for example centering either the "G" or "T" character in a two band embodiment. The user can use this resetting function to further limit the number of key presses by jumping off a band that was navigated to the beginning of a spectrum segment (such as "A"), when the next letter to be selected is "H". FIG. 7 shows an example of a sequence of button presses that may be used to enter the string "I was here" using the embodiment shown in FIG. 4 where the letter G is initially highlighted.

The highlighting may move across a band as the character choosing means is employed so that the characters remain in the same screen location while the highlighting moves. Alternatively, the characters in the band may be rotated, with the highlighting remaining in the middle position.

The invention is not limited to the English character set. Any character set can be supported by arranging it into a number of horizontal or vertical, or otherwise oriented linear or non-linear, bands.

The invention may support accessibility for users with poor eyesight by the inclusion of functionality to view the bands at multiple screen sizes and resolutions. In addition, the invention may provide audible feedback on character selections in order to provide confirmative feedback.

It should be emphasized that the above-described embodiments of the present invention, particularly, any "preferred" embodiments, are possible examples of implementations, merely set forth for a clear understanding of the principles of the invention. Many variations and modifications may be made to the above-described embodiment(s) of the invention as will be evident to those skilled in the art.

The scope of the claims that follow is not limited by the embodiments set forth in the description. The claims should be given the broadest purposive construction consistent with the description as a whole.

What is claimed is:

1. A method for a user to specify a text string, the text string comprising a sequence of characters selected from an alphabet of characters, the method being performed by a processor running software, the method comprising the steps of:
   a. generating a display for presentation to a user, the display depicting at least two bands of characters, including a first depicted band;
   b. for each band, designating one character of the alphabet that is depicted in that band to be a focus character, with the designated focus character of the first depicted band being highlighted initially in the display;
   c. until a text string submission request from the user is received,
      i. if a character switch request is received from the user, removing the highlighting from the highlighted character in the display, and highlighting an adjacent character in the same depicted band as requested by the user,
      ii. if a band switch request is received from the user, removing the highlighting from the highlighted character in the display, and highlighting the designated focus character in another depicted band as requested by the user,
      iii. if a character selecting request is received from the user, selecting the highlighted character without altering the highlighting, and appending the selected character to the text string; and
   d. when a text string submission request is received, submitting the text string to a string processor,
   wherein only one character is ever highlighted at one time.

2. The method of claim 1, wherein the steps are repeated and step d further comprises clearing the text string.

3. The method of claim 1, wherein the depicted bands are ordered from the first depicted band to a last depicted band, the band switch request specifies whether to switch to the next depicted band or the previous depicted band in the order, and the other depicted band in step cii is the next depicted band in the order if the next depicted band was specified and there is a next depicted band, or the previous depicted band in the order if the previous depicted band was specified and there is a previous depicted band.

4. The method of claim 1, wherein the depicted bands are ordered from the first depicted band to a last depicted band, and the other depicted band in step cii is the next depicted band in the order, where the first depicted band is the next depicted band after the last depicted band.

5. The method of claim 1, wherein the characters in each depicted band are ordered from a first character to a last character, the character switch request specifies whether to switch to the next character or the previous character in the order, and the other character in step ci is the next character in the order if the next character was specified and there is a next character, or the previous character in the order if the previous character was specified and there is a previous character.

6. The method of claim 1, wherein each character in the alphabet is contained in one and only one of the depicted bands.

7. The method of claim 1, wherein the characters in each depicted band are displayed in alphabetical order.

8. The method of claim 1, wherein the characters in the alphabet comprise the letters A to Z, the numbers 0-9, and a space.

9. A system for generating text strings, a text string being a sequence of characters selected from an alphabet of characters, the system comprising:
   a. a processor running software adapted to generate a display for presenting at least two depicted bands of characters to a user, each of the at least two depicted bands having a plurality of characters of the alphabet with one character designated as a focus character, with the designated focus character of a first depicted band being highlighted initially in the display;
   b. a band switching means for switching the highlighting to the designated focus character of one of the presented bands that does not contain the highlighted character;
   c. a character choosing means for switching the highlighting from the highlighted character in a depicted band to an adjacent character in the same depicted band;
   d. a character selecting means for selecting the highlighted character and appending the selected character to the text string without altering the highlighting; and
   e. a string submission means for submitting the text string composed of the sequence of selected characters to a string processor,
   wherein only one character is ever highlighted at one time.

10. The system of claim 9, wherein each character in the alphabet is contained in one and only one of the depicted bands.

11. The system of claim 9, wherein the characters in each depicted band are displayed in alphabetical order.

12. The system of claim 9, wherein the characters comprise the letters A to Z, the numbers 0-9, and a space.

13. The system of claim 9, wherein the depicted bands are displayed horizontally, the band switching means are up and down buttons, and the character choosing means are left and right buttons.

14. The system of claim 9, wherein the depicted bands are displayed vertically, the band switching means are left and right buttons, and the character choosing means are up and down buttons.

15. The system of claim 9, wherein the character selecting means is a button.

* * * * *